No. 747,803. PATENTED DEC. 22, 1903.
J. J. TAYLOR, 2D & R. G. SHILEY.
FOLDING MACHINE.
APPLICATION FILED APR. 14, 1903.
NO MODEL. 5 SHEETS—SHEET 1.

Fig. 1.

Witnesses:
C. D. Kesler.
James L. Norris, Jr.

Inventors
John J. Taylor 2nd
Richard G. Shiley
By
James L. Norris.
Atty.

No. 747,803. PATENTED DEC. 22, 1903.
J. J. TAYLOR, 2D & R. G. SHILEY.
FOLDING MACHINE.
APPLICATION FILED APR. 14, 1903.
NO MODEL. 5 SHEETS—SHEET 4.

Witnesses
C. D. Kesler.
James L. Norris, Jr.

Inventors
John J. Taylor 2nd
Richard G. Shiley
By James L. Norris.
Atty.

No. 747,803. PATENTED DEC. 22, 1903.
J. J. TAYLOR, 2D & R. G. SHILEY.
FOLDING MACHINE.
APPLICATION FILED APR. 14, 1903.
NO MODEL. 5 SHEETS—SHEET 5.

Witnesses
C. D. Kesler
James L. Norris, Jr.

Inventors
John J. Taylor 2nd
Richard G. Shiley
By James L. Norris
Atty.

No. 747,803. Patented December 22, 1903.

UNITED STATES PATENT OFFICE.

JOHN J. TAYLOR, 2ND, AND RICHARD G. SHILEY, OF WARREN, PENNSYLVANIA, ASSIGNORS TO THE PISO COMPANY, OF WARREN, PENNSYLVANIA, A CORPORATION OF PENNSYLVANIA.

FOLDING-MACHINE.

SPECIFICATION forming part of Letters Patent No. 747,803, dated December 22, 1903.

Application filed April 14, 1903. Serial No. 152,616. (No model.)

*To all whom it may concern:*

Be it known that we, JOHN J. TAYLOR, 2nd, and RICHARD G. SHILEY, citizens of the United States, residing at Warren, in the county of Warren and State of Pennsylvania, have invented new and useful Improvements in Folding-Machines, of which the following is a specification.

This invention relates to a folding-machine, said machine being capable of quickly and accurately folding different articles, it having been found wholly efficient for folding books, in which connection it will be fully set forth in the following description. In such description we apply terms to certain of the parts which are those usually employed in this art; but such terms of course are used in their broad senses to include equivalent devices.

In the accompanying drawings we have selected for illustration a machine showing certain simple and convenient mechanisms for carrying out the objects of the invention; but the latter is not limited to the exact relation of said mechanisms nor to the constructions of the parts constituting the same, for material variations as to these and other points may be adopted within the scope of our claims succeeding such description.

In the drawings.

Like characters refer to like parts throughout the different views.

The different working parts of the machine may be supported in any convenient way. For this purpose we have represented a bed 2, which is of approximately rectangular form and which is adapted to be sustained upon a table or like device, as 3, at such distance from the floor or other foundation that the operator of the machine may readily reach the different parts thereof. A hanger 4 depends from the bed 2, extending through a suitable opening in the table 3 and carrying at its lower end in suitable bearings the shaft 5, from which the different working parts receive their motion. The shaft fixedly carries at one end a power-driven member, which is represented as consisting of a pulley 6, the belt of which is not shown and which may be driven by any desirable motor. The bed 2 has a slot in its forward end extending inward to about the center thereof and which is bridged by a plate 7, suitably fastened to the upper side of the bed. This bridge-plate 7 in turn is slotted at 8, the slot being formed in the inner edge of the plate and extending outward to about the center of the plate. The slot 8 registers with the slot in the bed 2. The plate 7 has a channel 9, the walls of which coincide and are in the same plane with those of the slot 8, said walls being grooved to receive lateral tongues upon a feed device 10, which is shown as consisting of a slide adapted to be mechanically reciprocated in order to feed the articles to be brought under the action of the folding mechanism, and the supply-hopper into which the books are initially placed in a pile we will now proceed to describe. Said hopper consists of a plurality of vertical strips 11, arranged in upright connected pairs. The respective pairs are set at right angles to each other in order that the hopper as a whole may present approximately a rectangular structure of skeleton form, and their bases are provided with right-angular feet 12, suitably fastened to the bridge-plate 7 at opposite sides of the slot 8. It will be understood that the lower ends of these strips, which strips constitute the open bottom supply-hopper, extend over the feed device 10, and the inner ones are separated therefrom a distance substantially equaling the depth of a book, whereby the latter may be freely advanced through the space separating the inner strips from the feed device. The feed device has a slot 13 extending outward from its inner edge, by reason of which the feed device presents at its inner end a bifurcated structure, the branches of the bifurcation being adapted to straddle the jaws of the folding mechanism, as will hereinafter appear, when said feed device is in its extreme advanced position. Said feed device has in its forward slotted portion a depression 14, the function of which will hereinafter appear. When the feed device is in its forward position, the non-slotted or solid portion thereof will cover or close the open bottom of the supply-hopper, in which a pile of books is situated, the lowermost book, of course, resting upon the feed device. As said feed device is moved backward and as the depressed portion 14 thereof comes under the open bottom of said hopper the lowermost book thereof can gravitate into said depressed portion, whereby as the feed device is advanced said lowermost book will be carried therewith by the abrupt shoulder 15, constituting the rear wall of the depression 14.

A vertically-disposed spindle is shown at 16, the folding-blade, as will hereinafter appear, being coöperative with said spindle, which is supported by suitable bearings upon the hanger 4. This vertically-disposed spindle is reciprocated by an eccentric 17, (see Fig. 3,) suitably fastened to the power-shaft 5 and embraced by the strap 18, to which the pitman 19 is connected, the latter in turn being pivoted at 20 to the spindle 16 at a suitable point in its height. As the shaft 5 is rotated by the pulley 6 the eccentric of course will be operated in order to reciprocate the spindle 16. A link 21 is jointed to the vertically-reciprocative spindle 16, near the lower end thereof, and is similarly connected to the short lower arm of a rocking lever 22, fulcrumed upon a suitable bracket on the hanger 4, the long upper arm of said lever being connected by a rod 23 with the under side of the feed device 10, which, it will be understood, is in the nature of a horizontally-reciprocatory slide. As the power-shaft 5 is rotated the feed device 10 will be moved back and forth in its guideways upon the machine to deliver the books to the folding mechanism.

The folding mechanism illustrated by us will now be set forth.

The spindle 16 is situated at the rear side of the machine, and the blade or knife constituting part of the folding mechanism is connected with the same. The folding mechanism also includes a pair of jaws mounted at the upper end of a spindle 24, located at the forward side of the machine. This spindle 24 extends through a sleeve 25, the function of which will be hereinafter set forth and which is carried by a suitable bearing upon an approximately yoke-shaped plate 26. (See Fig. 2.) To the lower end of the sleeve 25 is fastened the lateral arm 28, perforated at its outer end to receive the depending guide-pin 29 upon said yoke-shaped plate 26. Upon each of the vertically-disposed legs of the yoke-shaped plates are three screws, each denoted by 4', the intermediate ones of which are tapped into the hanger 4, said intermediate screws passing loosely and freely through perforations in the yoke 26, while the other screws simply abut against the hanger, said other or upper and lower screws being of course tapped into the yoke and being capable of manipulation in order to bring the yoke into an absolutely vertical position, to thereby properly position the jaws carried at the upper end of the spindle 24, which spindle, as is evident, is supported by the yoke. The spindle 24 terminates at its upper end in a head consisting of parallel plates 30, fastened to the front and rear flattened faces of the spindle by suitable means, the folding-jaws, as will hereinafter appear, being pivoted between these plates. The branches of the yoke 26 are united at their upper ends (see Fig. 5) by a substantially arcuate inward extension 31, from which guide-pins 32 rise, said guide-pins projecting through perforations in lateral ears 33 upon the inner jaw-carrying plate 30. The guide-pins 32, in connection with the guide-pin 29, hereinbefore described, maintain the vertically-reciprocating spindle 24 in absolutely correct relation to the yoke 26, whereby the proper relation between the jaws carried by said spindle and the yoke is also assured.

Figure 5:
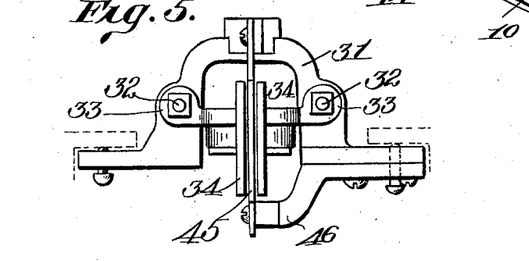
Fig. 5 is a plan view of a part of the folding mechanism.

The folding-jaws are denoted by 34, and they are pivoted just below their working edges, which, it will be seen, are in parallelism, as is indicated clearly in Fig. 5, between the plates 30, they being furnished below the pivots with elongated arms 35, connected near their free ends by the pull-spring 36, which normally maintains the jaws open. The working or upper portions of the jaws are made somewhat long, and their length is approximately that or a trifle longer than the depth of the book to be folded. Said jaws, as set forth, are normally held open by the spring 36, whereby as they are elevated they are adapted to receive between them the folding blade or knife 37.

Upon the upper side of the vertically-reciprocating spindle 16 is suitably fastened the overhanging head 38, the free portion of which is enlarged slightly, as at 39, and the under side of which is grooved to receive the upper edge of the folding blade or knife 37. One wall of the groove into which the blade is fitted is formed upon a block 40, which is adapted to be removably clamped—say by a screw 41—against the upper end of the blade, whereby the latter can be readily taken from place and, if necessary, another one substituted therefor.

Upon the main shaft 5 of the machine and suitably fastened to the same near its forward end is a cam 42, having upon its front face a cam-segment 43, the working face of which is adapted to engage an antifriction-roller 44, supported at the lower end of the jaw-carrying shaft or spindle 24 in order to vertically reciprocate said shaft to thereby carry the jaws sustained thereby to the working position thereof to make a fold in the book. The blade 37 also has an upward-and-downward movement, a part of the motion of the same being in unison with that of the folding-jaws. The cam 43 is adapted to elevate the shaft or spindle 24, the retractive motion of the shaft being accomplished by its own weight and the parts carried thereby being sufficiently heavy to cause the same to fall after the working face of the cam 43 has passed out of contact with the antifriction-roller 44. At the proper point in the operation of the machine the entering end of the cam 43 will engage the antifriction-roller to thereby elevate said shaft. The function of the cam 42 will hereinafter appear.

Figure 2:
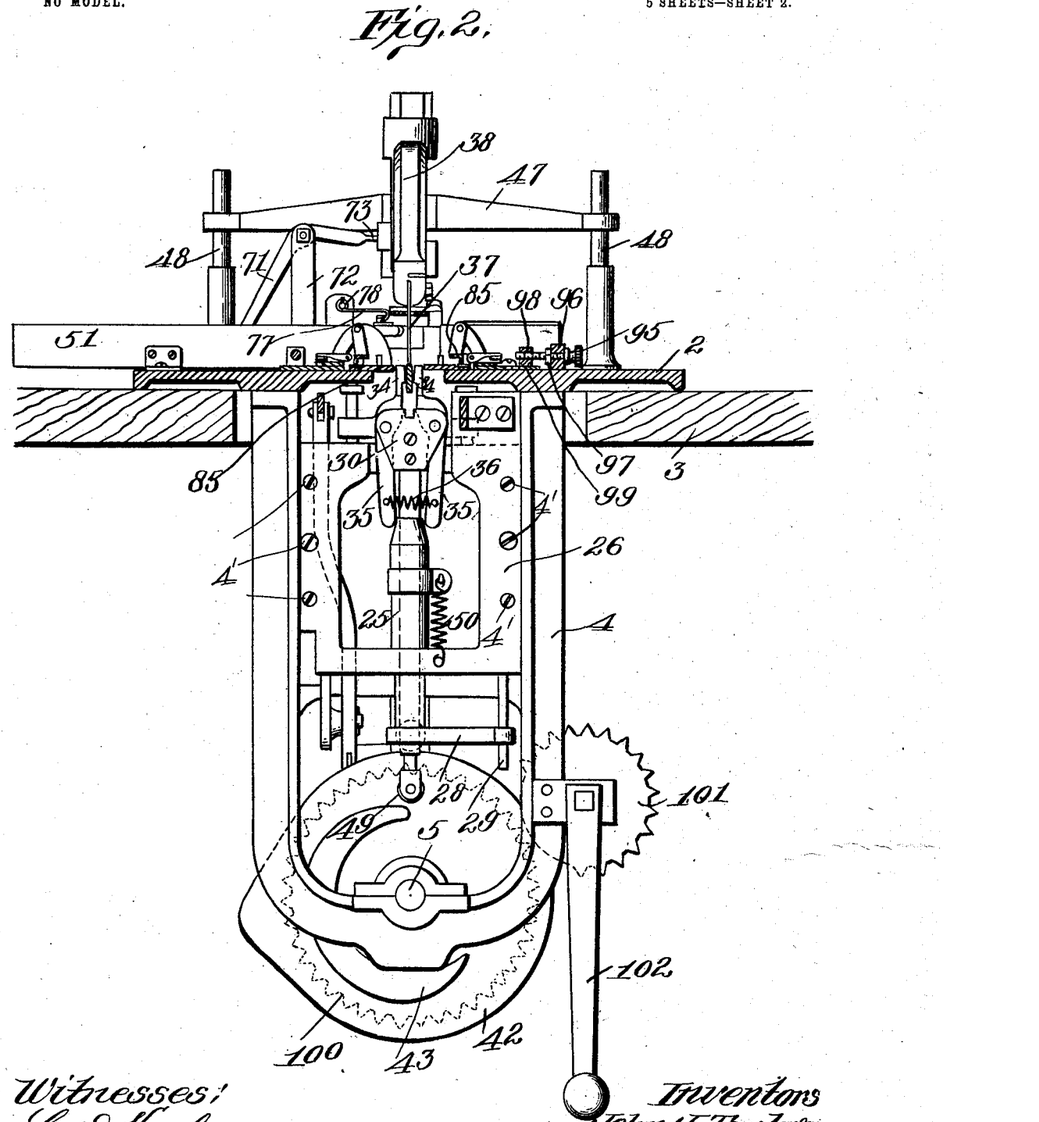
Fig. 2 is a sectional front elevation of said machine.

A stationary blade 45 is suitably fastened to the arcuate extension 31 and to a forwardly-extending arm 46 upon the upper end of what is shown in Fig. 2 as the right branch of the yoke 26. (See also Fig. 5.) This fixed blade or knife 45 coöperates with the movable or vertically-reciprocated blade 37 during the folding operation, it being adapted to support what might be considered the under side or back of the book centrally of the same, means being provided, as will hereinafter appear, to centralize the book with respect to the two blades in order that an arcuate fold may be made.

A cross-head 47 is fastened to the shaft 16, near the upper end thereof, the arms of the cross-head extending oppositely therefrom and terminating in hubs, the holes of which receive vertical pillars 48 in parallelism upon the upper side of the bed 2 and at opposite sides of the said spindle. The said pillars prevent lateral motion of the blade or knife carrying head 38, whereby the latter is caused to follow a correct working path during its advancing and retracting movements.

Figure 3:
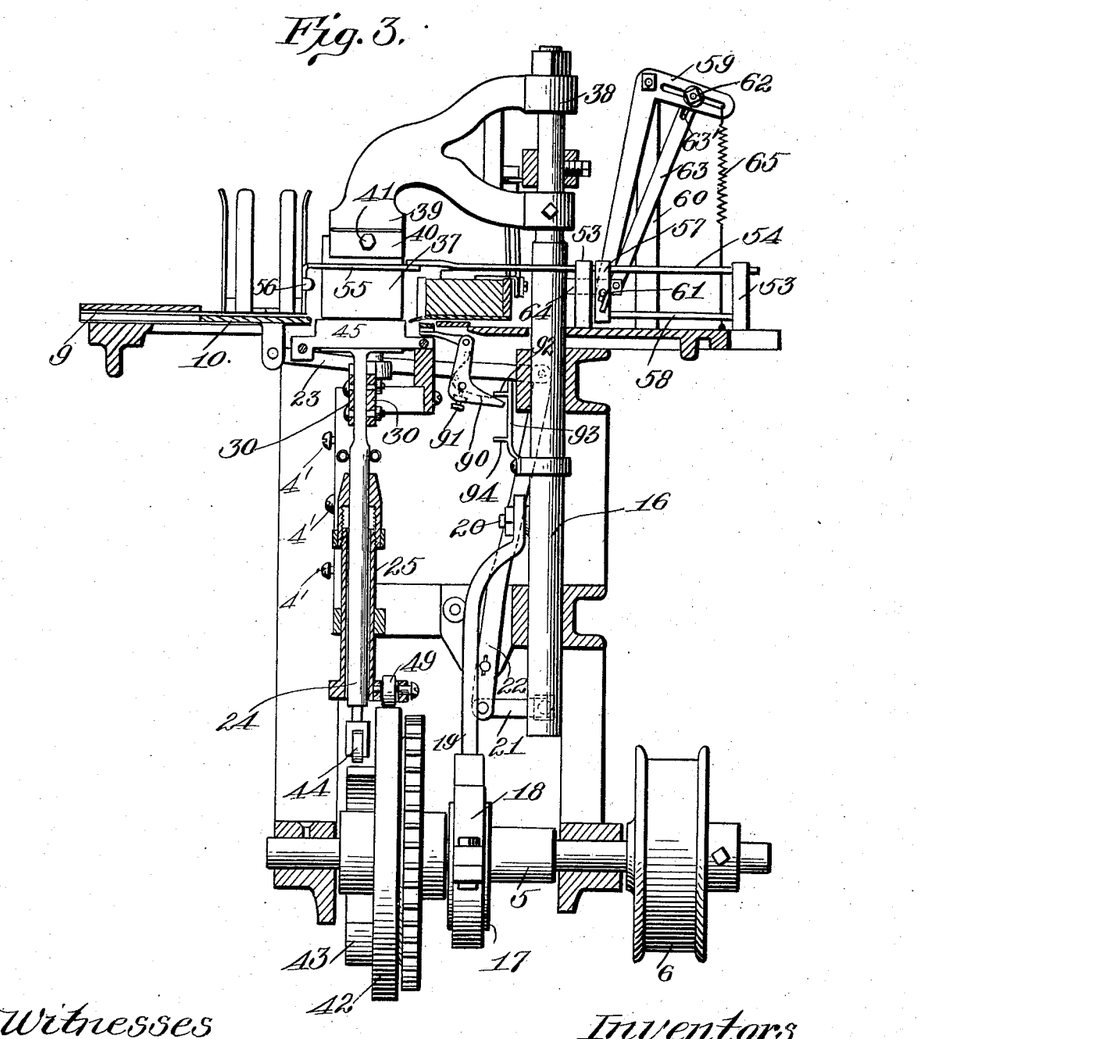
Fig. 3 is a sectional side elevation of the same.
Figure 9:
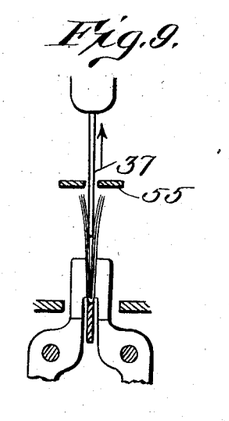

The parts are shown in Fig. 3 with the feed device 10 in its extreme advanced position, and at this time it will be assumed that the back of a book is resting upon the fixed blade 45 centrally of the width of said book, during which time a pile of books is resting upon the solid rear portion of the feed device 10. Upon the rotation of the power-shaft 5 the entering end of the cam 43 will engage the roller 44, and as the shaft 5 rotates said cam 43 will thrust the shaft or spindle 24, and consequently the jaws 34, upward, causing said jaws to follow parallel paths and straddle the blade 37, which at this time is in its lowermost or extreme advanced position, the sides of the book being folded by the rising jaws over the blade 37. At about the time the jaws have reached their extreme advanced or uppermost position under the action of the cam 43 the blade 37 will be elevated under the action of the eccentric 17, acting upon the shaft or spindle 16 through the intermediate connections. As the jaws elevate they of course fold the sides of the book against the opposite faces of the vertical blade 37, which at this time is between said jaws. Just about the time the jaws reach their topmost position, as shown in Fig. 9, the blade 37 under the action of the eccentric 17 and intermediate connections will be elevated above the same and subsequently lowered, with the under edge thereof approximately in contact with the fixed blade 45 in order to fold a second book, which in the meantime has been fed between the fixed and movable blades. We provide means for closing the jaws after they, in connection with the blade 37, have folded a book to pinch the book between the same in order that said book will be maintained in its folded condition, and the means for operating the jaws to secure this result will now be set forth.

Figure 8:
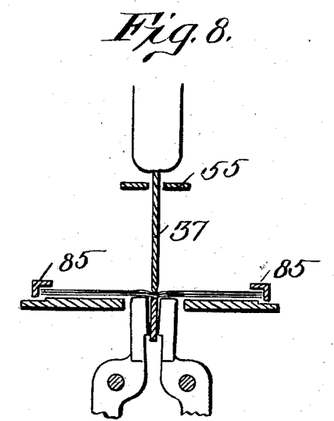
Figs. 8, 9, and 10 are sectional front views of the folding mechanism in different positions.
Figure 10:
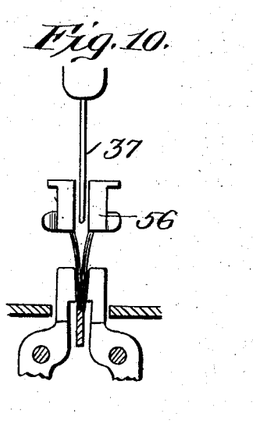

The sleeve 25 has a reciprocative motion upon and relatively to the shaft or spindle 24, it terminating at its upper end in the cone 48. This sleeve 25 is thrust upward by the working portion of the cam 42, engaging an antifriction-roller 49, mounted upon a projection at the lower end of the sleeve, said sleeve being positively lowered by a coiled pull-spring 50, connected with the sleeve and also with a suitable pin upon the yoke 4. Just succeeding the time at which the vertically-reciprocative blade 37 passes free of the jaws 34 the beveled portion of the cone-head 48 will engage the free lower ends of the arms 35 of the two jaws, (see Figs. 2 and 9,) and as the sleeve moves upward the cone will separate said arms, and consequently force the jaws inward and toward each other, whereby the book between the same is firmly pinched, so that when it is removed from the jaws, as will hereinafter appear, it will retain its folded condition. Immediately following this operation the working portion of the cam 42 passes out of contact with the roller 49, whereby the sleeve 25 can be returned to its initial position by the coiled spring 50. During the folding operation the feed device or slide 10 is in its extreme advanced position, with the branches of the bifurcation thereof straddling the folding-jaws. After the blade 37 leaves the jaws the feed device 10 is thrust rearward by virtue of its connections with the reciprocative spindle 16, it being understood that upon the elevation of said spindle the feed device is moved rearward, while the opposite action of the feed device occurs as the spindle is lowered through the agency of the intermediate connections. When the feed device reaches its extreme retracted position, at which point the depression 14 will be in registration with the open bottom of the supply-hopper, the lowermost book of the pile in said hopper can fall into said depression, whereby as the feed device is advanced said lowermost book will be carried therewith by the action of the abrupt shoulder 15. The upper face of the depression 14 is substantially in the same horizontal plane as the upper edge of the blade 45, so that as the feed device is advanced the said lowermost book will be placed upon the upper edge of the fixed blade. The slotting of the bed 2 in the manner hereinbefore described permits the proper action of the folding mechanism, the jaws, and blade, which, it will be understood, move toward and from each other during the operation of the machine, working in such slot. The book advanced by the slide, as just stated, is placed upon the upper edge of the fixed blade 45, constituting part of the folding mechanism, and said upper edge, as will be seen upon reference to Figs. 8, 9, and 10, is longitudinally channeled, so that as the upper or movable blade descends and approaches the lower one with a book between the same the back of the book as it is folded will fit in such channel, whereby lateral motion of the book during the folding operation is prevented. The book is pinched together in the manner hereinbefore described just as the feed device commences its rearward stroke, the pinching operation being concluded before the rearmost position of the feed device is reached, and after such pinching operation and just at the time the feed device commences to advance the jaws will have been lowered with their upper edges approximately flush with the corresponding portion of the intermediate fixed blade. Just after the book has been placed upon the fixed blade the folding-jaws are elevated in the manner hereinbefore described to fold the book upon said movable blade, the operation being then repeated in the manner set forth. During the time that the feed device is advancing with a book to the folding mechanism an ejector is being moved into position to remove the folded and pinched book from the folding mechanism and to enter the same into the receiving-trough 51, suitably fastened to the upper side of the table 2 and having in one side thereof a mouth or inlet 52, through which the books are successively passed. It will be seen that the upper face of the bottom of said trough is approximately in the same horizontal plane with the upper or working edge of the stationary blade 45.

Figure 4:
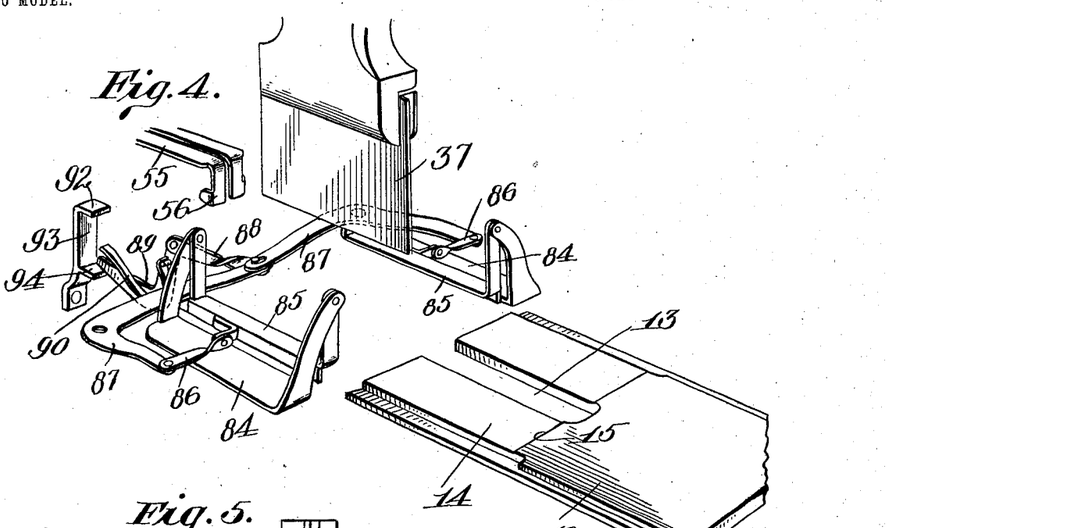
Fig. 4 is a perspective view, on an enlarged scale, of the folding-blade, gage or centering mechanism, the feed device, and a portion of the ejector shown in said first-mentioned figures.

Upon the rear of the bed 2 are fastened the uprights 53, through the upper ends of which the horizontally-slidable rod 54 is adapted to travel, said rod having an ejector 55 at its inner end. (See Figs. 3 and 4.) Said ejector 55 is bifurcated to straddle the movable folding-blade 37 and is provided with a depending working portion 56 at its extreme outer end, which engages at the outer end of a folded and pinched book, so that as the ejector is advanced it will thrust the book from between the opened folding-jaws 34 and into the receiving-trough 51 by way of the side mouth 52 therein, which mouth is made sufficiently wide to freely receive the book. A block 57 is suitably fastened to the sliding jaw 54, depending therefrom and sliding upon the fixed rod 58, extending between the uprights 53 in parallelism with and below the sliding rod 54, such construction preventing turning of the rod 54, and consequently of the ejector 55, connected therewith. An angle-lever 59 is pivoted at its elbow to a post or standard 60 upon the upper side of the bed 2, the longer arm thereof having a bifurcation at its lower end which straddles a pin 61 upon the block 57. The short arm of the angle-lever is longitudinally slotted to adjustably receive the bolt 62, which passes through a longitudinal slot in the upper end of a link 63, pivoted at its lower end to a projection 64, extending rearward from the spindle 16 above the bed 2, the loose connection between the link 63 and angle-lever 59 permitting a certain amount of lost motion of the lever with respect to the link. To the extreme outer end of the short or upper arm of the angle-lever 59 is connected a coiled pull-spring 65, the lower end of which is suitably connected with the bed 2. Just at the time that the feed device 10 is in its extreme advanced position, as shown in Fig. 3, the ejector 55, and consequently the rod 54, to which it is connected, will be in similar positions. It will be understood that the ejector receives its motion from the shaft 5 through the intermediate connections. As said shaft rotates and just after the folding mechanism has been returned to its initial position and the feed device has commenced to move backward, during which time the shaft or spindle 16 is being elevated, the link 63 will be thrust upward, and the lower wall of the slot 63' therein will strike against the pin 62 on the short arm of the angle-lever 59, following which said short arm will be thrust upward, thereby swinging the long arm of the angle-lever rearward, and hence imparting a like motion to the sliding block 57, whereby the ejector 55 through the intermediate rod 54 is given a working motion, during which time the depending fingers 56 at the extreme outer end thereof will engage behind the book that has just been folded and will move the same into the receiving-trough 51 through the mouth 52 therein. The shaft 16 has a greater motion than the ejector 55, and the presence of the loose connection between the link 63 and angle-lever 59 permits a relative movement of the shaft with respect to the ejector.

We have just set forth the manner in which the ejector is moved to its extreme advanced position in order to deliver a book into the receiving-trough 51, the lower wall of the slot 63' when said ejector is in said extreme advanced position being in contact with the pin 62 upon the short arm of the angle-lever 59, this relation being secured by the elevation of the shaft 16. Just as the ejector reaches its extreme advanced position the feed device 10 will have reached its extreme rearward position, the folding-jaws 34 at this time being wide open and up, while the folding-blade 37 is of course elevated. As the shaft 16 lowers to carry said folding-blade into working position, the folding-jaws and slide being simultaneously moved toward such position, the link 63 will naturally be lowered, and at this time the spring 65 comes into play, its function being to pull down the short arm of the angle-lever 59, so that the long arm thereof is swung inward to thereby thrust the slide 57, and hence the rod 54 and the ejector 55, in a corresponding direction, the ejector reaching its extreme advanced position just before the shaft 16 is fully lowered, following which the link 63 is drawn farther downward until the upper end of the slot 63' therein abuts against the pin or bolt 62, at which point the shaft 16 will have reached its lowermost position with the slide and folding mechanisms in their working relation. The ejector 55 being bifurcated, said ejector can freely straddle the blade as the latter is lowered and the ejector simultaneously advanced.

Figure 6:
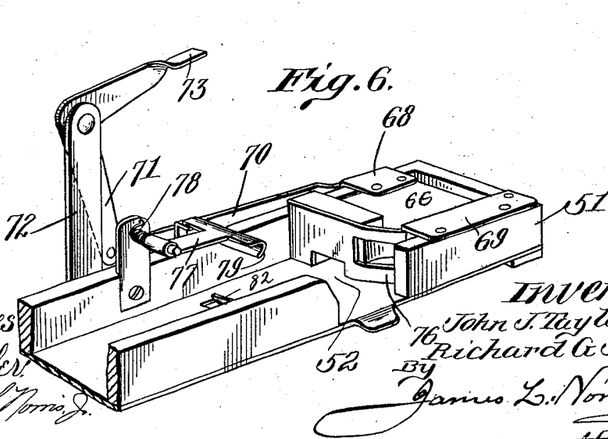
Fig. 6 is a perspective view of a portion of the receiving-trough.
Figure 7:
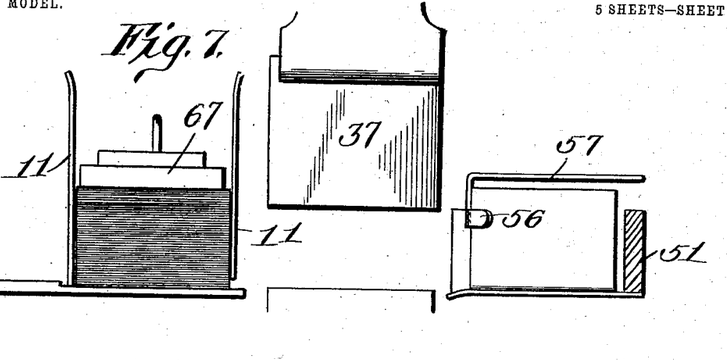
Fig. 7 is a sectional side view of the supply-hopper, feed device, receiving-trough, and shows also a portion of the folding mechanism.
Figure 11:
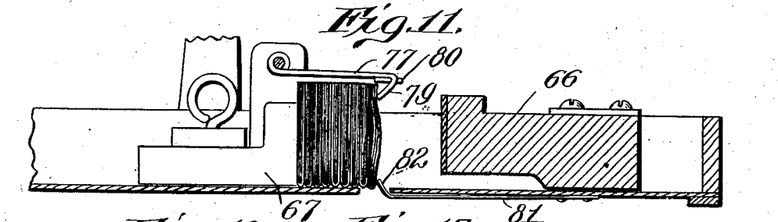
Fig. 11 is a sectional elevation of the receiving-trough and parts coöperative therewith.
Figures 12, 13:
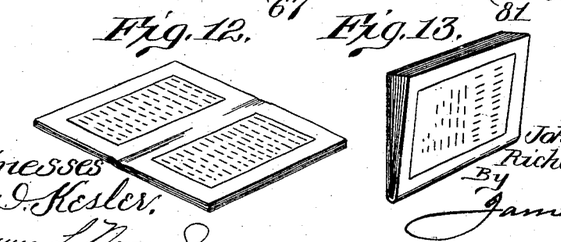
Figs. 12 and 13 are perspective views of a book prior and subsequent to its being folded.

A pressure-block 66 is slidable between the side walls of the receiving-trough 51 and is adapted on its advancing movement, during which time it moves toward the left in Fig. 11, to feed the folded books against the back or stop block or weight 67, which is approximately of the same width as the inside of the said feed-trough and slides toward the left end of the same as the books are successively moved therealong by the pressure-block 66 or, as it might be considered, a transverse feed device. This pressure-block or transverse feed device when the folding mechanism is in a working condition covers the mouth 52 of the receiving-trough; but during the time a folded book is being moved into the trough the pressure-block or transverse feed device is being operated in a direction to uncover said mouth, it uncovering the mouth at the time the book is in a position to enter the said trough. This pressure-block or transverse feed device receives its motion from the head 38, to which the folding-blade 37 is connected. Said block has secured to its upper side the horizontal portion of a right-angular plate 68, the vertical depending portion of which traverses the outer face of a side wall of the receiving-trough. A plate 69 is fastened to the upper edge of the opposite side wall of said trough and overhangs the said pressure-block or transverse feed device, whereby the same is held against upward displacement. (See Fig. 6.)

Figure 1:
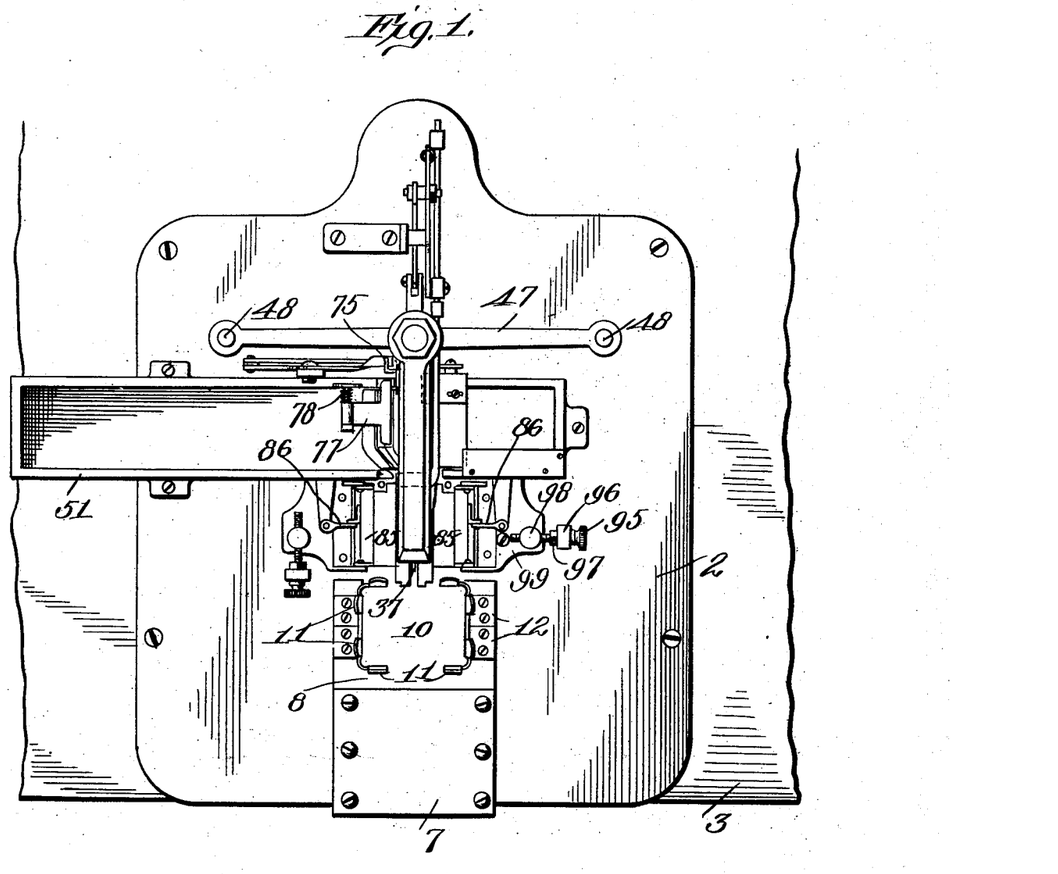
Figure 1 is a plan view of the machine.

To the vertical depending portion of the plate 68 is pivoted one end of a link 70, the opposite end of which is likewise connected to the lower end of an arm of an angle-lever 71, pivoted at its elbow upon an upright 72 on the bed 2. The other arm of the angle-lever has a flattened portion 73, which fits in a notch in a plate or projection 75, suitably fastened to the blade-carrying head 38. (See Figs. 1 and 2.) As the shaft 16 is reciprocated the angle-lever 71 by virtue of its connections therewith is rocked, the parts being so related that at the time the ejector is being moved forward the lower arm of the angle-lever 71 is being swung inward, so as to move the transverse feed device or pressure-block 66 toward what is shown as the right in Fig. 11 to thereby uncover the mouth in the trough 51, whereby a book can be readily introduced into said trough by the moving ejector. The block 66 is provided with a curved guide portion 76 near its working end by which a folded book can be properly guided into said receiving-trough. As the ejector 55 travels toward its working position, a folded book at this time having been introduced into the receiving-trough 51, the under arm of the angle-lever 71 is swung outward, so that by virtue of its connection with the pressure-block the latter may be moved in a corresponding direction to push the book against a series of folded books resting against the slidable stop-block, as shown in Fig. 11.

Means are provided for preventing retractive movement of the books after they are placed against the stop-block 67, and the same will now be described. A pawl or detent is shown at 77, it being pivoted upon a bearing upon the receiving-trough 51 and being held in its working position by a coiled spring 78, encircling the pivot thereof and bearing against the hub of the same and also against the said bearing. The free end of this detent or pawl is provided with a beveled lip 79, which as the folded books are transversely fed by the block 66 is adapted to be successively engaged by the upper edges of said books, whereby the lipped end of the pawl will be slightly elevated in order that the books may be placed against the block 67 or a series of books resting against the same. As soon as a book has passed free of the beveled lipped end of the detent 77 said end will be lowered into contact with a fixed stop 80 by the coiled spring 78. A leaf-spring 81 is fastened to the under side of the trough 51 and has an upwardly-projecting and slightly-beveled finger 82 projecting through a slot in the bottom of the trough in vertical line with the beveled lipped end 79 of the detent. As the under sides or backs of the books are brought against this spring-finger 82 by the action of the traveling block 66 said spring-finger will be lowered beneath the plane of the upper face of the bottom of the trough, so that the books can be properly positioned therein, and as soon as the books pass clear of such spring-finger the latter is at once elevated by the action of the spring 81, the depression of the beveled lipped end 79 of the detent 77 taking place at the same time, whereby the books are held in proper position in the trough, as illustrated clearly in Fig. 11.

Gage means are provided for centering the books with respect to the folding mechanism and will now be set forth.

Upon opposite sides of the slot in the table 2, through which the folding-jaws and folding-blade operate, are suitably fastened the yoke-shaped brackets 84, between the arms of which, at the upper ends thereof, are pivoted the correspondingly-shaped gage devices 85, the horizontal bodies of which constitute the effective portions thereof. These horizontal portions of the two swinging yoke-shaped parts 85 are in parallelism and have pivoted to their outer sides the links 86, (see Fig. 4,) to the outer ends of which are attached the short arms of angle-levers 87, the other arms of the angle-levers extending inward and being united to each other and also to the link 88, the opposite end of said link being pivoted to the substantially upright arm of the angle-lever 89, suitably supported upon the hanger 4. As a book is moved into position to be folded, with the under side thereof over the fixed blade 45, the side edges of the book will be between the straight edges of the parallel horizontally-disposed portions of the swinging members 85, and just after the book is positioned said swinging members are moved simultaneously inward to engage the side edges of the book to thereby absolutely center the same with respect to the said fixed blade and naturally of the movable one 37 over the same. To prevent the crinkling of the book, I apply a yielding pressure to the gage or centering devices 85, as will now appear. The angle-lever 89, which it will be understood is connected to the said gaging or centering devices, carries a bowed spring 90, the tension of which may be regulated by a set-screw 91, the free end of the spring being adapted to be engaged by the upper projection 92 of the actuator 93 on the descending motion of the shaft 16, it being seen that said actuator is connected (see Fig. 3) at its lower end to a ring upon said shaft. The upper projection 92 is adapted by acting against the free end of the bowed spring 91 to yieldingly throw the two gage or centering devices 85 to their working positions. A second projection 94 upon said actuator 93 returns the two centering or gage devices to their initial positions and free of the book between the same. Just before the blade 37 reaches its extreme lowermost position on the descending motion of the shaft 16 the projection 92 will strike the free end of the spring 90, thereby moving the lower arm of the angle-lever 89 downward and through the intermediate connections swinging the two gage devices 85 inward, so that by engaging the side edges of the book they can center the same with respect to the fixed blade 45, the centering operation being concluded at the time the shaft reaches its lowermost position, and this inward position of the two gage devices is maintained during the initial elevation of the shaft and blade 37. When the shaft 16 has moved upward a short distance, the projection 94 will of course strike the angle-lever 90 and return the two gage devices to their primary positions, this operation occurring at about the point the feed device 10 reaches its extreme backward position.

In order to provide for the accurate positioning of the gage or centering devices 85 in the setting up of the machine, the brackets 84, which carry said gage devices, are adjustable toward and from each other, and the means for accomplishing such adjustment will now be set forth.

Adjusting-screws 95 are passed freely through lugs 96 upon the upper side of the bed 2 outside of the respective brackets, and at opposite sides the lugs are embraced by holding and check nuts, each denoted by 97. The inner ends of the respective holding and adjusting screws 95 are tapped into bosses 98 upon plates 99, to which the bases of the respective brackets 84 are attached. By manipulating the adjusting-screws 95 after the parts have been mounted the brackets 84 can be moved toward or from each other in order to accurately position the gage devices, and when they are so located the holding-nuts in each case will be tightened up in order to maintain the relation.

Upon the shaft 5 is suitably fastened a gear 100, meshing with a pinion 101, fixed to a short shaft carried upon the hanger 4, and which short shaft carries a hand-crank 102, which may be manipulated in order that any of the parts may be returned to their initial positions by hand in case any difficulty is experienced during the normal operation of the machine. During the normal operation of the machine the hand-crank 102 is of course not applied; but in case any difficulty should be encountered, such as the crumpling of a book between the jaws, the hand-crank will be applied in order to lower the jaws or to operate any other part of the machine to a desired extent to remove such crumpled book. When the hand-crank 102 is in use, the belt which drives the pulley 6 and which is not illustrated is of course at rest.

With the parts in the positions indicated in Fig. 3 the feed device 10 by virtue of its connection with the shaft 5 will as said shaft rotates under the action of the continuously-moving pulley 6 be moved rearward in order to bring the depressed portion 14 of the feed device under a stack of superposed books placed within the strips 11, constituting the supply-hopper, the folding-jaws 34 being first opened to release a book pinched between the same, during which opening movement the blade 37 is being elevated, said blade reaching its topmost position at the time the feed device 10 reaches its extreme retracted position. Just before the feed device is moved forward the folding-jaws 34 will be lowered to bring their upper edges substantially flush with the fixed and longitudinally-grooved blade 45. As the feed device moves forward in the manner hereinbefore described with a book, the book is fed over the fixed blade and the two jaws, the movable blade during this time being lowered. When the book is in position, the two jaws are elevated to fold the book upon the fixed blade 37, following which said blade is lifted clear of the two jaws and the latter then moved together to pinch the book between the same. After the jaws have been moved together and then opened in the manner hereinbefore described the ejector is brought into action to push the folded and pinched book into the receiving-trough 51, following which the parts are returned to their first positions in order to repeat the operation.

The various cams and other driving and connecting devices are so timed, and related as to secure the operation of the parts in the sequence just set forth.

The invention is not limited to the exact construction hereinbefore described, for various changes may be made within the scope of our claims.

Having thus described our invention, what we claim as new, and desire to secure by Letters Patent, is—

1. In a folding-machine, folding mechanism including a blade and a pair of jaws, mechanism for moving the blade toward and between the jaws from above the same, and a stationary blade for supporting the under side of an article while under the action of the folding mechanism.

2. In a folding-machine, folding mechanism including a blade and a pair of jaws, mechanism for moving the blade toward and between the jaws from above the same, and a stationary blade for supporting the under side of an article while under the action of the folding mechanism, said fixed blade being longitudinally channeled.

3. In a folding-machine, folding mechanism including a blade and a pair of jaws, means for moving said parts toward and from each other to cause the jaws to overlap the blade, and a stationary blade located below the other blade and adapted to support the under side of an article while under the action of the folding mechanism.

4. In a folding-machine, folding mechanism including a blade and a pair of jaws, means for moving said parts toward and from each other along parallel paths to cause the blade to enter the jaws and subsequently to leave the same, a conical member in position to engage said jaws, and means for actuating said conical member in a direction to close the jaws after the blade has passed from between the same.

5. In a folding-machine, a blade and a pair of jaws, shafts for carrying the blade and jaws, means for operating the shafts to carry the jaws and blade toward and from each other to cause the blade to enter the jaws and then leave the same, a sleeve surrounding the jaw-carrying shaft having a cone for operating the jaws in a direction to close the same, and means for operating the sleeve relative to the shaft it surrounds.

6. In a folding-machine, folding mechanism including a blade and a pair of jaws, said jaws having depending arms, a spring connecting said arms, shafts to which the jaws and blade are connected, means for operating the shafts to carry the blade and jaws toward and from each other to cause the blade to enter the jaws and then leave the same, a sleeve surrounding the jaw-carrying shaft having a cone at its upper end to engage said arms in a direction to close the jaws, and means for operating said sleeve relative to the shaft it surrounds to move it in a jaw-closing direction after the blade has been carried free of the jaws.

7. In a folding-machine, folding mechanism including a blade and a pair of jaws, mechanism for moving the blade into the space between the jaws, a stationary blade for supporting the under side of an article while under the action of the folding mechanism, and a receiving-trough for the folded articles, the upper face of the bottom of the trough being approximately in the same plane as the upper edge of said stationary blade.

8. In a folding-machine, folding mechanism including a blade and a pair of jaws, mechanism for moving the blade into the space between the jaws, a stationary blade for supporting the under side of an article while under the action of the folding mechanism, a receiving-trough for the folded articles, the upper face of the bottom of the trough being approximately in the same plane as the upper edge of said stationary blade, a feed device for the folded articles in the receiving-trough, and mechanism for operating said feed device.

9. In a folding-machine, folding mechanism including a blade and a pair of jaws, mechanism for moving said parts toward and from each other to cause the jaws to overlap the blade, a stationary blade for supporting the under side of an article while under the action of the folding mechanism, a receiving-trough having a mouth in its side in line with said stationary blade, the upper face of the bottom of said trough being substantially in the same horizontal plane as the upper edge of said stationary blade, a feed device in the trough for the folded articles, and mechanism for reciprocating said feed device.

10. In a folding-machine, folding mechanism including a blade and a pair of jaws, mechanism for moving said parts toward and from each other to cause the jaws to overlap the blade, and stationary means for supporting an article while under the action of the folding mechanism.

11. In a folding-machine, folding mechanism including a blade and a pair of jaws, mechanism for moving said parts toward and from each other to cause the jaws to overlap the blade, stationary means for supporting an article while under the action of the folding mechanism, a receiving-trough, means for moving the folded article from the folding mechanism into the receiving-trough, and a feed device for moving the folded articles along the feed-trough.

12. In a folding-machine, folding mechanism including a blade and a pair of jaws, mechanism for moving said parts toward and from each other to cause the jaws to overlap the blade, stationary means for supporting an article while under the action of the folding mechanism, a receiving-trough, means for moving the folded article from the folding mechanism into the receiving-trough, a feed device for moving the folded articles along the feed-trough, and automatically-operative means for engaging the innermost folded article in the feed-trough to prevent retractive movement of the folded articles.

13. In a folding-machine, folding mechanism, a receiving-trough, means for moving a folded article from the folding mechanism into the receiving-trough, the latter having a mouth for the entrance of the folded articles, a spring-finger constituting a detent for the folded articles, projecting upward through a slot in the bottom of the trough, an automatic detent in vertical line with said other detent for also engaging the folded articles, a feed device in said trough, and means for moving the feed device back and forth.

14. In a folding-machine, folding mechanism including a pair of jaws and a blade, means for operating one of said devices to cause the blade to enter the jaws, a reciprocatory bifurcated ejector for the folded articles adapted on its backward stroke to straddle the blade, and means for operating said ejector, the latter on its working stroke being adapted to move the folded articles from the folding mechanism.

15. In a folding-machine, folding mechanism including a pair of jaws and a blade, means for operating one of said devices to cause the blade to enter the jaws, a reciprocatory bifurcated ejector for the folded articles adapted on its backward stroke to straddle the blade, and means for operating said ejector, the latter on its working stroke being adapted to move a folded article from the folding mechanism, a reciprocatory feed device for the articles, the forward end of which is bifurcated, and the folding mechanism being adapted to work between the branches of the bifurcation of the feed device when the latter is in its advanced position, and means for operating the feed device.

16. In a folding-machine, folding mechanism including a pair of jaws and a blade, means for operating one of said devices to cause the blade to enter the jaws, an ejector for the folded articles, means for operating the ejector, a receiving-trough for the folded articles, a reciprocatory feed device for the folded articles in the receiving-trough, a link connected with said reciprocatory feed device, an angle-lever connected with the link, and mechanism for rocking the angle-lever to move said feed device back and forth.

17. In a folding-machine, folding mechanism including a pair of jaws and a blade, shafts to which the jaws and blade are connected, mechanism for operating the shafts to cause the blade to enter the jaws and then leave the same, means for feeding the articles to the folding mechanism, an ejector for the folded articles, a trough to receive the folded articles, a feed device for the folded articles, and mechanism operative with the shaft that carries the blade for moving the feed device back and forth.

18. In a folding-machine, folding mechanism including a pair of jaws and a blade, shafts to which the jaws and blade are connected, means for operating the shafts to cause the blade to enter the jaws, a reciprocatory feed device for the articles to be folded, and mechanism operative with the shaft that carries the blade for actuating said reciprocatory feed device.

19. In a folding-machine, folding mechanism including a pair of jaws and a blade, shafts to which the jaws and blade are connected, means for operating the shafts to cause the blade to enter the jaws, a reciprocatory feed device for the articles to be folded, a lever fulcrumed upon the framework, a link connected with one end of the lever and also with the shaft to which said blade is connected, and a rod connected with the other end of the lever and also with said feed device.

20. In a folding-machine, folding mechanism including a pair of jaws and a blade, shafts to which the jaws and blade are connected, means for operating the shafts to cause the blade to enter the jaws, a reciprocatory feed device for the articles to be folded, mechanism operative with the shaft that carries the blade for actuating said reciprocatory feed device, an ejector for the folded articles, mechanism for reciprocating the ejector, a receiving-trough for the folded articles, a feed device in the receiving-trough, and connections between the blade-carrying shaft and said last-mentioned feed device for reciprocating the latter.

21. In a folding-machine, folding mechanism including a pair of jaws and a blade, shafts to which said jaws and blade are connected, a power-shaft provided with an eccentric, a split ring embracing said eccentric, furnished with a pitman connected with the blade-carrying shaft to thereby reciprocate the latter, a cam connected with said power-shaft, for imparting a working stroke to the jaw-carrying shaft, a sleeve upon the jaw-carrying shaft provided with a cone for operating the jaws in a direction to close the same, and a cam connected with said power-shaft for imparting a working stroke to said sleeve.

22. In a folding-machine, folding mechanism including a pair of jaws and a blade, shafts to which the blade and jaws are connected, mechanism for actuating the shafts to cause the blade to enter the jaws, a yoke upon the framework, supporting said jaw-carrying shaft, screws passing freely through perforations in the branches of the yoke and tapped into the framework of the machine, and adjusting-screws tapped into said branches at opposite sides of the other screws and engaging the framework for adjusting the yoke.

23. In a folding-machine, folding mechanism including a blade and a pair of jaws, mechanism for moving said parts toward and from each other to cause the jaws to overlap the blade to thereby fold an article, a stationary blade for supporting the under side of the article while under the action of the folding mechanism, centering devices at opposite sides of said stationary blade for engaging the side edges of said article, and means for simultaneously moving the centering devices inward to thereby center the same with respect to the folding mechanism.

24. In a folding-machine, folding mechanism including a blade and a pair of jaws, mechanism for moving said parts toward and from each other to cause the jaws to overlap the blade to thereby fold an article, a stationary blade for supporting the under side of an article while under the action of the folding mechanism, centering devices at opposite sides of said stationary blade for engaging the side edges of said article, and means for simultaneously moving the centering devices inward with a yielding pressure to thereby center the same with respect to the folding mechanism.

25. In a folding-machine, folding mechanism including a pair of jaws and a blade, means for operating one of said devices to cause the blade to enter the jaws, a pair of swinging centering devices at opposite sides of the folding mechanism to engage the side edges of the article to be folded, links jointed to the centering devices and extending outward therefrom, angle-levers, one arm of each being connected with a link and the other arms thereof being connected to each other, a link united to said last-mentioned arms at their joint, an angle-lever connected to said last-mentioned link, and means for acting upon said last-mentioned angle-lever with a yielding pressure.

26. In a folding-machine, folding mechanism including a pair of jaws and a blade, shafts to which the jaws and blade are connected, mechanism for operating the shafts to cause the blade to enter the jaws, a pair of swinging centering devices at opposite sides of the folding mechanism to engage the side edges of an article to be folded, links jointed to the centering devices and extending outward therefrom, angle-levers, one arm of each being connected with a link, the other arms thereof being connected to each other, a link connected with said last-mentioned arms at their joint, an angle-lever connected to said last-mentioned link, a spring upon said last-mentioned angle-lever, a part connected with the blade-carrying shaft for engaging the said spring to operate the angle-lever upon which it is mounted with a yielding pressure to thereby throw the centering devices into their working position, and a second part also connected with said shaft for directly engaging said last-mentioned angle-lever to return the centering devices to their initial positions.

27. In a folding-machine, folding mechanism including a pair of jaws and a blade, a shaft to which the blade is connected, mechanism for reciprocating said shaft, an ejector for the folded articles, a sliding rod to which said ejector is connected, a sliding block fastened to said sliding rod, an angle-lever, one arm of which is connected with said sliding block, a link operatively connected with said shaft and loosely connected with the other arm of the angle-lever, and means connected with said other arm of the angle-lever for operating it in opposition to the shaft.

28. In a folding-machine, folding mechanism including a pair of jaws and a blade, a shaft to which the blade is connected, mechanism for reciprocating said shaft, an ejector for the folded articles, a sliding rod to which said ejector is connected, a sliding block fastened to said sliding rod, an angle-lever, one arm of which is connected with said sliding block, a link operatively connected with said shaft and loosely connected with the other arm of the angle-lever, and a spring connected to said other arm of the angle-lever for operating it in opposition to said shaft.

29. In a folding-machine, folding mechanism including a pair of jaws and a blade adapted to enter the jaws, a shaft to which said blade is connected, mechanism for reciprocating the shaft, an ejector for the folded articles, a sliding part to which the ejector is connected, an angle-lever one arm of which is operatively connected with the sliding part and the other arm thereof carrying a pin, a link operatively connected at one end with said shaft, the other end having a longitudinal slot to receive said pin, and means connected with the arm of said angle-lever which carries the pin, for operating said lever in opposition to the shaft.

In testimony whereof we have hereunto set our hands in presence of two subscribing witnesses.

JOHN J. TAYLOR, 2ND.
RICHARD G. SHILEY.

Witnesses:
EDWARD LINDSEY,
H. R. FISHER.